United States Patent [19]

Jueptner et al.

[11] Patent Number: 5,185,411

[45] Date of Patent: Feb. 9, 1993

[54] POLYMERIZATION OF WATER-SOLUBLE MONOMERS

[75] Inventors: Guenter A. Jueptner, Hammah; Susanne M. Karrasch, Stade, both of Fed. Rep. of Germany

[73] Assignee: The Dow Chemical Company, Midland, Mich.

[21] Appl. No.: 821,529

[22] Filed: Jan. 14, 1992

[30] Foreign Application Priority Data

Jan. 17, 1991 [GB] United Kingdom ................. 9101004

[51] Int. Cl.$^5$ .......................... C08F 2/32; C08F 26/04
[52] U.S. Cl. .................................... 526/200; 524/801; 524/813; 524/815; 524/808; 526/202; 526/216; 526/218.1; 526/227; 526/201; 526/260; 526/265; 526/273; 526/304; 526/295; 526/307; 526/310

[58] Field of Search ............... 526/295, 310, 200, 202, 526/216, 201; 524/801, 457, 459, 813, 815, 808

[56] References Cited

U.S. PATENT DOCUMENTS

| | | | |
|---|---|---|---|
| 3,920,599 | 11/1975 | Hurlock et al. | 524/801 |
| 4,459,396 | 7/1984 | Yamasaki et al. | 526/200 |
| 4,713,431 | 12/1987 | Bhattacharyya et al. | 526/207 |
| 4,973,632 | 11/1990 | Nagasuna et al. | 526/200 |

Primary Examiner—Joseph L. Schofer
Assistant Examiner—M. Nagumo

[57] ABSTRACT

Mono- or copolymers of water-soluble monomers of formula I are produced by preparing a two-phase system containing droplets of an aqueous solution of the monomers in a water-immiscible inert organic liquid. The monomers are polymerized in the presence of a combination of a suspending agent and an emulsifier.

20 Claims, No Drawings

POLYMERIZATION OF WATER-SOLUBLE MONOMERS

FIELD OF THE INVENTION

The present invention relates to a process for preparing homopolymers or copolymers of water-soluble monomers by preparing a two phase system containing droplets of an aqueous solution of the monomers in a water-immiscible inert organic liquid and polymerizing the monomers.

Specifically, the present invention relates to a process for preparing homopolymers or copolymers of water-soluble monomers of formula I

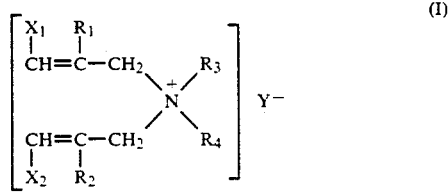

wherein $R_1$, $R_2$, $R_3$, $R_4$, $X_1$ and $X_2$ have the meanings stated below.

BACKGROUND OF THE INVENTION

U.S. Pat. No. 2,982,749 relates to inverse suspension polymerization of water-soluble unsaturated monomers. The U.S. Pat. teaches that an aqueous solution of the unsaturated monomer is suspended in an oil phase and polymerized therein to give polymeric products in bead form. The bead size is controlled by a suspending agent. The suspending agent is a solid or liquid substance having a low hydrophile-lyophile balance. Ethyl cellulose and other organic polymers which have some hydrophilic substituents but predominantly hydrophobic substituents are mentioned as suspending agents. The suspended monomer is heat-polymerized in the presence of a polymerization initiator. Various neutral and anionic monomers are listed; the cationic vinylbenzyl trimethyl ammonium chloride is also mentioned, among others.

German Offenlegungsschrift 2,009,218 also relates to the polymerization of ethylenically unsaturated monomers in a liquid phase which is suspended in a liquid organic medium in the presence of initiators and suspending stabilizers. The liquid monomer phase may consist of an aqueous solution of an ethylenically unsaturated monomer which is not soluble in the organic medium. The suspension stabilizer has a molecule portion which is solvated by the organic medium and another molecule portion which is solvated by the aqueous monomer phase. Examples of neutral, anionic and cationic monomers are listed, such as dialkylaminoalkyl esters or amides of acrylic or methacrylic acid, for example dimethylaminoethyl methacrylate, beta-morpholinoethyl acrylate or diethylaminomethyl methacrylamide. Salts of these monomers containing amino groups with acids, such as hydrochloric acid and the quaternization products which are obtained by reacting the monomers containing amino groups with an alkyl halide are also mentioned.

U.S. Pat. No. 4,151,202 relates to the production of pure diallyl dimethyl ammonium chloride (DADMAC). In the disclosed method DADMAC is produced from allyl chloride of high purity. Pure DADMAC is then polymerized in water according to a solution polymerization process using a free radical catalyst.

U.S. Pat. No. 3,920,599 relates to a water-in-oil emulsion of a DADMAC homopolymer or a copolymer of DADMAC and acrylamide which has been prepared by polymerization in the presence of a low HLB emulsifier, such as sorbitan monooleate, and a free radical initiator.

U.S. Pat. No. 4,439,580 discloses a process for preparing high molecular weight water-in-oil polymer emulsions. Cationic monomers of the type disclosed by formula I are used for the production of the polymers. The U.S. Patent teaches that the polymerization at a pH of 7 to 13 and the addition of a salt is critical. The polymerization is carried out in the presence of a surfactant which is selected from low HLB (hydrophile/lipophile balance) surfactants as summarized in McCutcheon's "Detergents and Emulsifiers", 1978 edition, MC publishing company, pages 17-23.

However, in various trials made by the applicants of polymerizing an aqueous solution of a water-soluble monomer of formula I in a water-immiscible inert organic liquid in the presence of various emulsifiers, unstable emulsions were obtained during polymerization and agglomerations took place at the walls of the reactor.

One object of the present invention is a process for polymerizing monomers of formula I wherein agglomerations of particles are minimized or avoided.

SUMMARY OF THE INVENTION

The present invention relates to a process for preparing polymers or copolymers of water-soluble monomers of formula I above wherein
- $R_1$ and $R_2$ independently are hydrogen, a methyl or ethyl group or halogen;
- $R_3$ and $R_4$ independently are hydrogen, an alkyl, hydroxyalkyl, carboxyalkyl, carboxyamide alkyl or alkoxyalkyl group containing from 1 to 18 carbon atoms in the alkyl moiety, an epoxy group or hydrogen or the group $R_3$-N-$R_4$ together represent the unsubstituted piperidine ring, a piperidine ring substituted with one or more $C_{1-18}$-alkyl groups, the unsubstituted morpholinium ring or a morpholinium ring substituted with one or more $C_{1-18}$-alkyl groups;
- $X_1$ and $X_2$ independently are hydrogen, a $C_{1-6}$-alkyl group, or halogen, or halogen; and
- $Y^-$ represents an anion, by preparing a two-phase system containing droplets of an aqueous solution of at least one monomer of formula I in a water-immiscible inert organic liquid and polymerizing said at least one monomer, characterized in that the polymerization is carried out in the presence of a combination of a suspending agent and an emulsifier.

Surprisingly, it has been found that by using an emulsifier together with a suspending agent in the mentioned polymerization process, agglomeration of the produced polymer particles does not take place to a substantial extent. Generally, high monomer concentrations, often even saturated monomer solutions, can be used for preparing the polymer according to the process of the present invention. Typically, monomer conversions of more than 80 percent, in many cases of 90 percent or more are attained. Typically, the polymer is obtained in the form of solid beads having a high molar mass. Applicants have tried to carry out the polymerization process in the presence of a suspending agent only but in the absence of an emulsifier. Particle agglomeration and insufficient monomer conversion have been observed. Applicants have also tried to carry out the polymerization in the presence of an emulsifier only but in the absence of a suspending agent. Instable emulsions and agglomeration of particles at the reactor walls, stirring means etc. have been observed.

French patent 1,297,047 discloses a polymerization of water-soluble acrylamides, methacrylamides or acrylic acids according to a water-in-oil polymerization. The polymerization is carried out in the presence of an emulsifying agent and, optionally, in the presence of a suspension stabilizer or of an agglomeration inhibitor. However, the French patent does not relate to polymers, which contain ammonium ions in the polymer chain. Furthermore, the French patent teaches that the presence of an emulsifying agent is necessary but that the presence of a suspension stabilizer or an agglomeration inhibitor is not necessary.

DETAILED DESCRIPTION OF THE INVENTION

Polymers or copolymers of water-soluble monomers of formula I shown above are prepared.

In formula I $R_1$ and $R_2$ independently are hydrogen, a methyl or ethyl group or halogen such as chlorine or bromine. The methyl group and hydrogen are preferred meanings for $R_1$ and $R_2$ with the latter being the most preferred one.

If $R_3$ and/or $R_4$ are alkyl, hydroxyalkyl, carboxyalkyl, caboxyamide alkyl or alkoxyalkyl, the alkyl moiety variety has from 1 to 18, preferably from 1 to 12, more preferably from 1 to 8 and most preferably from 1 to 6 carbon atoms. Illustrative examples of alkyl groups are methyl to dodecyl inclusive, preferably methyl, ethyl, isopropyl, n-propyl, and the unbranced or branched butyl, pentyl, hexyl, octyl or decyl groups of which the methyl group is the most preferred group. Representative of hydroxyalkyl groups are hydroxyethyl and the various higher hydroxyalkyl groups from hydroxypropyl to hydroxyoctadecyl inclusive. Representative of carboxyalkyl groups are carboxymethyl and the various higher carboxyalkyl groups from carboxyethyl to carboxyoctadecyl inclusive. Representative of carboxyamide alkyl groups are carboxyamide methyl and the various higher carboxyamide alkyl groups from carboxyamide ethyl to carboxyamide octadecyl inclusive.

$X_1$ and $X_2$ independently are halogen, such as chlorine or bromine, a $C_{1-6}$-alkyl group, such as methyl or ethyl, or hydrogen with hydrogen being the most preferred substituent.

Illustrative examples of anions represented by Y are the halide ions, (that is, Y can represent halogen; more particularly, chlorine, bromine, fluorine or iodine), sulfate, sulfonate, phosphonate, hydroxide, borate, cyanide, carbonate, thiocyanate, thiosulfate, isocyanate, sulfite, bisulfite, nitrate, oxalate, silicate, sulfide, cyanate, acetate, and the other common inorganic and organic anions.

Specific examples of the cationic monomers include the diallyl dimethyl, dimethallyl dimethyl and diethallyl dimethyl, diallyl di-(beta-hydroxyethyl) and diallyl di-(beta-ethoxyethyl) ammonium chlorides, bromides, phosphates and sulfates of which the diallyl dimethyl ammonium halides are preferred.

Homopolymers and copolymers may be prepared from the above cationic monomers of formula I alone or in combination with non-cationic, water-soluble olefinic monomers. When the cationic monomers of formula I are polymerized alone, one or more types of monomers of formula I may be used. Copolymers of the cationic monomer and on-cationic, water-soluble olefinic monomers which may be used, alone or in admixture with one another, include the acrylamides, such as acrylamide, methacrylamide, N,N-dimethyl acrylamide; the dialkylaminoalkyl acrylamides, such as dimethylaminoethyl acrylamide and methacrylamide; the acrylic acids, such as acyrlic acid and methacrylic acid; or various dialkylaminoalkyl acrylates, such as dimethylaminoethyl acrylate or dimethylaminoethyl methacrylate. It is preferred to use 50 to 100 weight percent cationic monomers and 0 to 50 weight percent non-cationic, water-soluble olefin monomers. More preferably, 100 percent cationic monomers represented by formula I are used for homo- or copolymerization. Most preferably, homopolymers are prepared from the water-soluble monomers of formula I.

In the practice of the present invention an aqueous solution of the above-mentioned monomers is prepared. Water may optionally be mixed with ethanol or methanol or a minor amount of another water-miscible organic solvent. However, such a water based mixture has to be selected in such a manner that the monomer of formula I is soluble therein and that a two phase system is obtained when contacting the water based mixture with a water-immiscible inert organic liquid. Generally, the amount of the water-miscible organic solvent in the aqueous phase should not be more than 40 percent, preferably not more than 20 percent, by total volume of the aqueous phase. Preferably, water is used as the only solvent for the monomers of formula I. Although the aqueous phase may contain the monomer(s) in a wide range of concentrations, a high initial monomer concentration is preferred in order to achieve a high polymerization rate and a high molar mass of the produced polymer. Aqueous solutions which are nearly saturated with the monomers are preferred. The preferred monomer concentrations in the aqueous solutions of course depend on the solubility of the monomer. In the case of diallyl dimethyl ammonium chloride (DADMAC) an aqueous solution containing generally from 50 to 95 weight percent, preferably from 70 to 95, most preferably from 80 to 90 weight percent DADMAC is preferred. When dissolving other monomers of formula I in the aqueous solvent, typically from 50 to 100 percent, preferably from 60 to 85 percent of the amount which is required to prepare a saturated solution is dissolved in water.

Any water-immiscible organic liquid is useful for providing the organic phase. Aromatic or aliphatic hydrocarbons which are optionally mixed with halogenated hydrocarbons are preferred. Specific examples are benzene, toluene, or xylene, mineral oils, mineral spirits, kerosenes and brominated and/or chlorinated hydrocarbons, such as 1,1,1- trichloroethane, 1,2- dichloropropane, tetrachloroethene, trichloropropanes and tetrachloromethane.

Preferably, the organic phase contains from 30 to 100 percent of an aromatic or aliphatic hydrocarbon and from 70 to 0 percent of a halogenated hydrocarbon. Mixtures of different hydrocarbons and halogenated hydrocarbons are also useful. Furthermore, aromatic ethers such as methyl phenyl ether are also useful organic liquids.

Preferably, the organic phase and the aqueous monomer solution have about the same density, that is, the density ratio between the organic phase and the aqueous monomer solution generally is from 0.9:1 to 1.25:1, preferably from 1.01:1 to 1.1:1. The volume ratio between the inert organic liquid and the aqueous monomer solution generally is from 1:1 to 20:1, preferably from 2:1 to 10:1, more preferably from 3:1 to 5:1.

It should be noted that the terms "water soluble" and "water-immiscible" refer to the behavior of the components at ambient pressure and at the prevailing polymerization temperature.

It is essential to add a suspending agent and an emulsifier to the reaction mixture.

Useful emulsifiers are for example carboxylic acid glycerides, mainly the fatty acid glycerides such as the glycerol palmitates, sterates, oleates or linoleates. The glycerol mono-, di- and/or triesters are useful. Esters produced by the reaction of carboxylic acids, such as fatty acids, with sorbitol, such as the sorbitol palmitates, stearates, oleates or linoleates are also useful. The mono-, di-, tri and/or tetraesters are useful. Of the mentioned esters, the glycerol or sorbitol sterates or oleates are the most preferred ones. Soaps, such as the alkali metals salts of carboxylic acids having from 12 to 18 carbon atoms, preferably the sodium or potassium oleate, linoleate, stearate or palmitate are also useful emulsifiers. It has been found that the best polymerization results with substantially no agglomeration of the produced articles are achieved when amulsifiers are used which have a hydrophile/lipophile balance (HLB number) of 3 to 5, preferably of 3.7 to 4.7. Several emulsifiers may be mixed.

Useful suspending agents are high molecular water soluble compounds, such as cellulose ethers, for example methyl cellulose ethers, hydroxypropyl methyl cellulose ethers, ethyl cellulose ethers; starch, partially saponified polyvinyl acetate, alkali metal salts, preferably the sodium or patassium salts, of polyacrylic acid or polymethacrylic acid or of copolymers of styrene or vinyl acetate, a polyethylene imine or preferably, a polyvinyl alcohol. The hydroxyl groups in the polyvinyl alcohol may partially be replaced by ether groups such as methoxy groups. A saponified ethylene/vinyl acetate copolymer is also useful. Several of the mentioned suspending agents may be mixed. The molecular weight of polyvinylalcohol preferably is from 50,000 to 500,000, more preferably from 60,000 to 85,000. The molecular weight of polyethylene imine preferably is from 25,000 to 75,000.

The emulsifier and the suspending agent are preferably used at an amount of from 0.5 to 5%, more preferably of from 0.5 to 1.5% and most preferably of from 0.75 to 1% each, based on the weight of the aqueous solution.

The emulsifier and the suspending agent are typically added to the water-immiscible inert organic liquid before the organic liquid and the aqueous monomer solution are mixed.

The aqueous solution generally comprises one or more polymerization initiators. Such polymerization initiators are generally known and usually are of the azo or peroxide type. Useful azoinitiators are for example 2,2-azobis-(N,N'-dimethylene-isobutyramidine) dihydrochloride, 2,2'-azobis-(2-amidinopropane) dihydrochloride or 4,4'-azobis-(4-cyanopentane-carboxylic acid).

Useful peroxide initiators are for example tert.-butylhydroperoxide, hydrogen peroxide, ammonium persulfate, potassium persulfate, sodium persulfate, or redox catalyst in combination with reducing agents such as iron(II)-ammonium sulfate, ascorbic acid, sodium methyl sulfinate, disodium disulfite, sodium hydrogen sulfite, sodium phosphite, potassium phosphite or hydrogen phosphite, sodium hypophosphite or potassium hypophosphite. These initiators can be used either alone or in combination with one another. Thus the rate of peroxide decomposition can be adapted, for example, to the particular polymerization temperature selected. Preferred redox catalysts are those from one or several peroxides in combination with a reducing agent. Especially preferred are persulfates as a component of the redox polymerization initiators. The polymerization initators are generally used in amounts ranging from 0.001 to 5% by weight and preferably from 0.02 to 2% by weight, relating to the amount of monomers employed.

To initiate polymerization, a two-phase system is prepared which contains droplets of an aqueous solution of one or more of the above-mentioned monomers in an above-mentioned water-immiscible inert organic liquid. In the practice of carrying out the process of the present invention, the aqueous phase, containing one or more types of said monomers and usually one or more reaction initiators in the above-mentioned amounts, is suspended in the inert organic liquid, for example by mixing the two phases under agitation. It is immaterial whether the aqueous solution is added to the water-immiscible organic liquid or vice versa. Preferably, the two phases are slowly mixed under vigorous stirring at 200 to 1500 rpm, preferably at 225 to 275 rpm. Generally, the two phases should be contacted under agitation with a Reynolds number of from 10,000 to 150,000, preferably from 70,000 to 100,000. The droplets of the aqueous solution in the produced two-phase system preferably have an average diameter of from 0.2 to 7 mm, more preferably of from 1 to 3 mm. The emulsifier and the suspending agent may be added in the above-mentioned amounts to the inert organic liquid or to the aqueous solution before mixing the two phases. Alternatively, the emulsifier and the suspending agent may be added after having mixed the two phases. However, the emulsifier and the suspending agent are typically added to the water-immiscible inert organic liquid before the organic liquid and the aqueous monomer solution are mixed.

It is advisable to deoxygenate the resulting emulsion with nitrogen and then to increase the temperature of the reaction mixture whereby the polymerization is initiated. The optimum temperature at which the polymerization occurs is from 20° C. to 95° C., preferably from 50° to 90° C. Most preferably, the initial polymerization temperature is about 55° C. and is then increased to about 75° C. the reaction mixture is generally stirred during the entire polymerization process in order to maintain a stable system of aqueous droplets in an immiscible organic phase and to keep the exothermic reaction under control. The required time period for completing the reaction of course depends on various parameters, such as reaction temperature etc. However, typically a conversion of the monomers of 85% or more is reached within 8 hours. After having completed the reaction, the reaction mixture is cooled and the produced polymer in the shape of beads can be isolated, for example by sieving and drying the beads in a known manner. Generally, the produced beads have an average diameter of from 0.25 to 2.5 mm. The produced polymers generally have a weight average molecular mass between 500,000 g/mole and 3,000,000 g/mole, preferably between 1,000,000 and 2,500,000 g/mole.

The process of the present invention is further illustrated by the following Examples which should not be construed to limit the scope of the invention. Unless otherwise mentioned, all parts and percentages are by weight.

EXAMPLE 1

An aqueous solution containing 85% of diallyl dimethyl ammonium chloride (DADMAC) was purged with nitrogen for at least one hour. Per 100 volume parts of the aqueous monomer solution 4 volume parts of an aqueous solution containing 20 percent of 2,2'-azobis(2-amidinopropane) dihydrochloride was added to the aqueous monomer solution under agitation.

An organic phase was prepared by mixing toluene and 1,1,1-trichloroethane at a volume ratio of 1:1. 0.75% of glycerol monostearate having a HLB number of 3.7, based on the weight of the aqueous phase, was added as emulsifier. The glycerol monostearate was commercially available from Atlas Chemie as Arlacel C (trademark). 0.75% of polyvinyl alcohol having a weight average molecular mass of 72,000 g/mole, based on the weight of the aqueous phase, was added as suspending agent.

The aqueous solution and the organic phase were mixed at a volume ratio of 1:4 under stirring at 250 rpm. Stirring was continued during the entire polymerization. The produced emulsion was heated to a temperature of 55° C. within 10 minutes and held at this temperature for 4 hours. The reaction temperature was raised to 75° C. within 10 minutes and held at this temperature for 2 hours. The reaction mixture was then cooled to 25° C. within 10 minutes. The produced solid beads were separated from the organic phase by sieving. The residual organic solvents on the beads were removed from the beads by drying at 70° C. at a reduced pressure of 200 mbar for 15 hours. The beads had diameters in the range of 0.25 of 2.5 mm.

The conversion of DADMAC was 92.8% and the weight average molecular mass of the produced poly-DADMAC was 2,250,000 g/mole. The beads were produced without observing agglomeration.

COMPARATIVE EXAMPLE A

Example 1 was repeated, however no emulsifier was used. The same suspending agent was used as Example 1 but at an amount of 1.0% by weight of the aqueous phase. The conversion of DADMAC was 72.4%. Particle agglomeration started after one hour.

EXAMPLE 2

Example 1 was repeated, however, the initial concentration of DADMAC in the aqueous solution was 90% and 0.75% (by weight of the aqueous phase) of ethyl cellulose, commercially available from The Dow Chemical Company as Ethocel HE350 (trademark), was used as a suspending agent. The conversion of DADMAC was 88% and the weight average molecular mass of the produced poly-DADMAC was 1,740,000 g/mole. The beads were produced without observing agglomeration.

COMPARATIVE EXAMPLE B

Example 2 was repeated, however no emulsifier was used. The same suspending agent was used as Example 2 but at an amount of 1.0% by weight of the aqueous phase. Particle agglomeration started after 1 hour. The conversion of DADMAC was 67.2%.

EXAMPLE 3

Example 1 was repeated, however the initial concentration of DADMAC in the aqueous solution was 90%, 1.0% of the emulsifier was added to the organic phase and as suspending agents were used 0.5% of ethyl cellulose, commercially available from The Down Chemical Company as Ethocel HE350 (trademark) and 0.5% of hydroxypropyl methyl cellulose, commercially available from The Dow Chemical Company as Methocel J75M (trademark). The amounts of the emulsifier and the suspending agents were based on the weight of the aqueous phase.

The conversion of DADMAC was 87.4% and the weight average molecular mass of the produced poly-DADMAC was 1,630,000 g/mole. The beads were produced without observing agglomeration.

EXAMPLE 4

Example 1 was repeated, however 0.75% of sorbitol monooleate having a HLB number of 4.3, commercially available from Atlas Chemie as Span 80 (trademark) was used as an emulsifier. The conversion of DADMAC was 94.7% and the weight average molecular mass of the produced poly-DADMAC was 2,340,000 g/mole. The beads were produced without observing agglomeration.

EXAMPLE 5

Example 4 was repeated, however the initial concentration of DADMAC in the aqueous solution was 90%. The conversion of DADMAC was 88.7% and the weight average molecular mass of the produced poly-DADMAC was 2,270,000 g/mole. The beads were produced without observing agglomeration.

EXAMPLE 6

Example 5 was repeated, however 0.75% of hydroxypropyl methyl cellulose, commercially available from The Dow Chemical Company as Methocel J75M (trademark) was used as a suspending agent. The conversion of DADMAC was 90.9% and the weight average molecular mass of the produced poly-DADMAC was 2,020,000 g/mole. The beads were produced without observing agglomeration.

EXAMPLE 7

Example 6 was repeated, however the amounts of the emulsifier and suspending agent were 1.0% each (instead of 0.75%), based on the weight of the aqueous phase. The conversion of DADMAC was 89% and the weight average molecular mass of the produced poly-DADMAC was 2,210,000 g/mole. The beads were produced without observing agglomeration.

EXAMPLE 8

Example b 2 was repeated, however, the initial concentration of DADMAC in the aqueous solution was 80% and 0.75% of sorbitol monostearate having a HLB number of 4.7, commercially available from Atlas Chemie as Span60 (trademark) was used as an emulsifier. The conversion of DADMAC was 90.9% and the weight average molecular mass of the produced poly-DADMAC was 1,340,00 g/mole. The beads were produced without observing agglomeration.

What is claimed is:

1. A process for preparing homopolymers or copolymers of water-soluble monomers of formula I $$\begin{bmatrix} \begin{array}{cc} X_1 & R_1 \\ | & | \\ CH=C-CH_2 \\ & \diagdown \\ & N^+ \\ & \diagup \diagdown \\ CH=C-CH_2 \\ | & | \\ X_2 & R_2 \end{array} \begin{array}{c} \\ R_3 \\ \\ R_4 \\ \\ \end{array} \end{bmatrix} Y^- \qquad (I)$$

wherein
  $R_1$ and $R_2$ independently are hydrogen, a methyl or ethyl group or halogen;
  $R_3$ and $R_4$ independently are hydrogen, an alkyl, hydroxyalkyl, carboxyalkyl, carboxyamide alkyl or alkoxyalkyl group containing from 1 to 18 carbon atoms in the alkyl moiety, an epoxy group or the group $R_3$-N-$R_4$ together represent the unsubstituted pieridine ring, a piperidine ring substituted with one or more $C_{1-18}$-alkyl groups, the unsubstituted morpholinium ring or a morpholinium ring substituted with one or more $C_{1-18}$-alkyl groups;
  $X_1$ and $X_2$ independently are hydrogen, a $C_{1-6}$-alkyl group or halogen; and
  $Y^-$ represents an anion,
  by preparing a two-phase system containing droplets of an aqueous solution of at least one monomer of formula I in a water-immiscible inert organic liquid and polymerizing said at least one monomer, wherein a polymerization is carried out in the presence of a combination of
  i) an emulsifier and
  ii) a suspending agent selected from the group consisting of cellulose ethers, starch, partially saponified vinyl acetates, alkali metal salts of polyacrylic or polymethacrylic acids, styrene/vinyl acetate copolymers, saponified ethylene/vinyl acetate copolymers, polyvinyl alcohols and polyethylene imines.

2. The process of claim 1, wherein the initial monomer concentration in the aqueous solution is from 50 to 95 percent by weight.

3. The process of claim 1, wherein the initial monomer concentration in the aqueous solution is from 70 to 95 percent by weight.

4. The process of claim 1, wherein the initial monomer concentration in the aqueous solution is from 80 to 90 percent by weight.

5. The process of claim 1, wherein a homopolymer of a diallyl dimethyl ammonium halide is prepared.

6. The process of claim 1, wherein the emulsifier is a soap, a carboxylic acid glyceride or a reaction product of a carboxylic acid and sorbitol, having a hydrophile/lipophile balance of 3 to 5.

7. The process of claim 6, wherein the suspending agent is a cellulose ether or a polyvinyl alcohol.

8. The process of claim 7, wherein the suspending agent and the emulsifier are dissolved in the organic reaction diluent in an amount of from 0.1 to 5% each, based on the weight of the aqueous solution.

9. The process of claim 1, wherein the emulsifier is a glycerol or sorbitol stearate or a glycerol or sorbitol oleate.

10. The process of claim 1, wherein the suspending agent is a cellulose ether or a polyvinyl alcohol.

11. The process of claim 1, wherein the suspending agent and the emulsifier are dissolved in the organic reaction diluent in an amount of from 0.1 to 5% each, based on the weight of the aqueous solution.

12. The process of claim 1, wherein the suspending agent and the emulsifier are dissolved in the organic reaction diluent in an amount of from 0.5 to 1.5% each, based on the weight of the aqueous solution.

13. The process of claim 1, wherein the suspending agent and the emulsifier are dissolved in the organic reaction diluent in an amount of from 0.75 to 1% each, based on the weight of the aqueous solution.

14. The process of claim 1, wherein the volume ratio of the inert organic liquid to the aqueous solution is from 1:1 to 20:1.

15. The process of claim 1, wherein the volume ratio of the inert organic liquid to the aqueous solution is from 2:1 to 10:1.

16. The process of claim 1, wherein the polymerization is carried out in the presence of a catalytic amount of a reaction initiator of an azo or peroxide type.

17. The process of claim 1, wherein the polymerization is carried out at a temperature of from 20° to 95° C.

18. The process of claim 1, wherein the polymerization is carried out at a temperature of from 50° to 90° C.

19. The process of claim 1, wherein the inert organic liquid is a mixture of a halogenated hydrocarbon and an aromatic or aliphatic hydrocarbon.

20. The process of claim 1, wherein a homopolymer of diallyl dimethyl ammonium chloride is prepared, the initial monomer concentration in the aqueous solution is from 80 to 90 percent by weight, the emulsifier is a glycerol or a sorbitol stearate or a glycerol or a sorbitol oleate, the suspending agent is a cellulose ether or a polyvinyl alcohol, the suspending agent and the emulsifier are dissolved in the aqueous reaction diluent in an amount of from 0.75 to 1% each, based on the weight of the aqueous solution, and the reaction is carried out in the presence of a catalytic amount of a reaction initiator of an azo or peroxide type.

* * * * *